(12) United States Patent
Burbidge

(10) Patent No.: US 6,621,506 B2
(45) Date of Patent: Sep. 16, 2003

(54) APPLYING OPERATIONS TO SELECTED DATA OF DIFFERENT TYPES

(75) Inventor: A. Michael Burbidge, Redmond, WA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 09/210,147

(22) Filed: Dec. 11, 1998

(65) Prior Publication Data

US 2003/0097491 A1 May 22, 2003

(51) Int. Cl.$^7$ ................................................. G09G 5/00
(52) U.S. Cl. ........................................ 345/764; 709/316
(58) Field of Search ................................ 345/762–770; 709/310–320

(56) References Cited

U.S. PATENT DOCUMENTS

| | | | | |
|---|---|---|---|---|
| 5,983,234 A | * | 11/1999 | Tietjen et al. | 707/103 R |
| 6,263,379 B1 | * | 7/2001 | Atkinson et al. | 345/762 |
| 6,330,006 B1 | * | 12/2001 | Goodisman | 709/332 |
| 6,498,612 B1 | * | 12/2002 | Brown et al. | 345/762 |

OTHER PUBLICATIONS

Gamma, Erich et al. Design Patters. 1995, Addison–Wesley. "Visitor", 331–344.*
Don Box, "Essential COM," Addison–Wesley Publishing Company, ISBN 0–201–63446–5, Apr., 1998.
http://www.microsoft.com/com/wpaper/compsvcs.asp—Microsoft® COM, Microsoft Component Services, 6 Pages.
http://www.microsoft.com/com/wpaper/Com_modl.asp—Microsoft® COM, The Component Object Model: Technical Overview, 21 Pages.
http://www.microsoft.com/com/components/default.asp—Microsoft® COM, COMponents, 27 Pages.
David A. Wilson, "Programming with MacApp," ISBN: 0–201–09784–2, pp. 132–136, and 152–155, Dec., 1989.
Apple Computer, "Inside Macintosh: Interapplication Communication," Chapters 3,4, and 5, Addison–Wesley Publishing Company, ISBN 0–201–62200–9, Jun. 1993.
Don Box, "Essential COM," Addison–Wesley Publishing Company, ISBN 0–201–63446–5, Apr., 1998.

* cited by examiner

*Primary Examiner*—St. John Courtenay, III
(74) *Attorney, Agent, or Firm*—Fish & Richardson P.C.

(57) ABSTRACT

Methods and apparatus implementing a technique for applying suites of operations to selected data through a user interface. In response to a selection of data from a user through a user interface, the user interface creates a specifier object which binds implementations of operations provided by the user interface to the selected data according to the type of the data. In general, the technique includes receiving a selection of data having a type from a user through a user interface of a computer program running on a computer; recognizing the type of the selected data; and creating a specifier object according to the type, where the specifier object specifies an implementation of an operation.

48 Claims, 4 Drawing Sheets

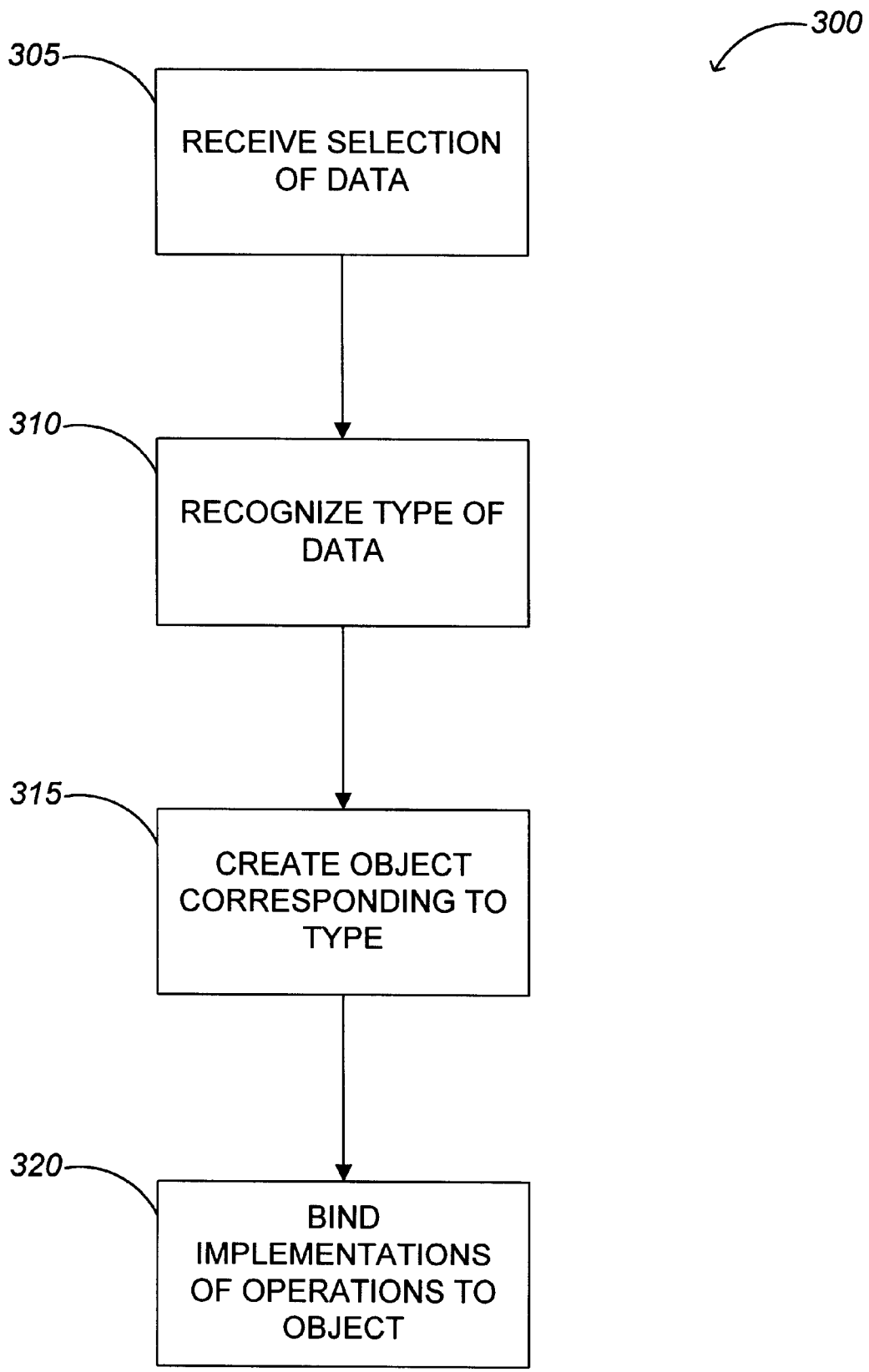

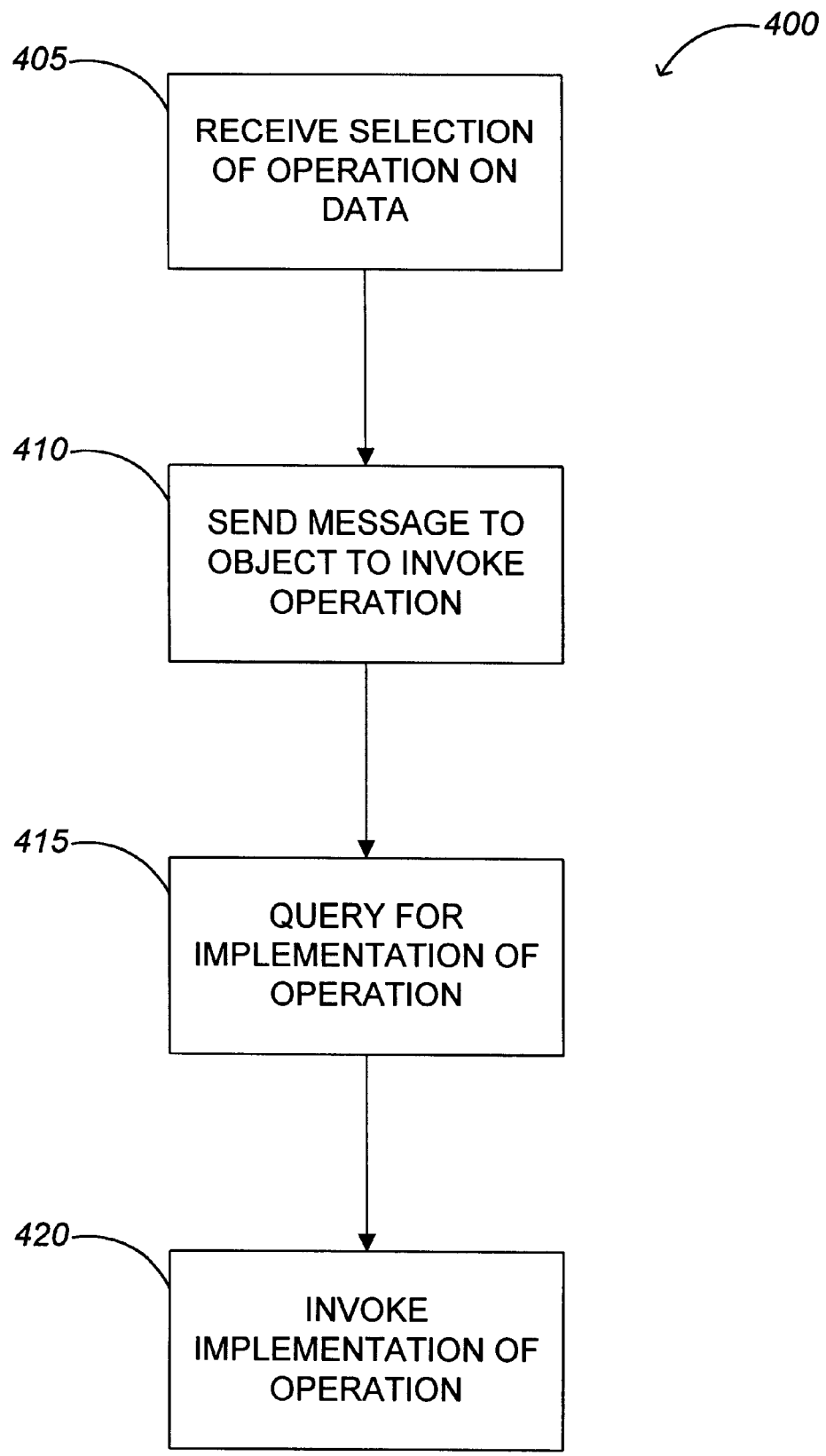

APPLYING OPERATIONS TO SELECTED DATA OF DIFFERENT TYPES

BACKGROUND

The invention relates to the design and the implementation of operations within a user interface of a computer program.

Graphics-oriented computer programs often allow a user to create and manipulate many different kinds of data through a user interface. The user interface typically provides the capability to apply operations to a currently selected range or set of data, such as a copy or color setting operation. The processes for storing and selecting data often vary depending on the data type. For example, in a page layout program, the selection could be a range of text, specified internally by a start position and a length, or a set of graphics objects, such as lines, ovals, and polygons, specified by a list of object identifiers. The processes for applying operations to a range of text and to a set of polygons can differ greatly. The user interface typically includes a separate implementation for each operation for each data type. When a new data type is to be added to the application program, the user interface is updated to add an implementation for each operation. Accordingly, the flexibility and efficiency of such user interfaces are limited because the user interface does not apply operations in a type-independent manner.

In object oriented program architectures, such as the Microsoft® component object model ("COM") system or the Java programming language, objects encapsulate data and the operations performed on the data. This encapsulation allows for improved modularity over earlier procedural architectures, typified by the C programming language.

COM provides special objects referred to as "COM objects". COM objects can be implemented in independent code modules or independent components. COM objects are different from objects in a generic object oriented programming sense, though such generic objects are used as building blocks for COM objects in a programming language such as C++. A COM program includes a collection of components defining COM objects. COM objects include interfaces. An interface abstractly defines a set of variables, and methods and functions implemented for the COM object. As abstract definitions, the actual implementations are separate from the interfaces. The interfaces provide a mechanism for a client program or object to invoke operations of the COM object. By definition, COM objects include several specific features, such as a "query interface" method to determine whether an operation is implemented for the COM object. Additional interfaces are defined and implemented to provide the functionality of the COM object. COM is described in many sources, including in Box, Don, "Essential COM", Addison-Wesley Publishing Company, 1998.

SUMMARY

The invention provides methods and apparatus implementing a technique for applying type-dependent implementations of type-independent operations to selected data through a user interface. In general, in one aspect, the technique includes receiving a selection of data having a type from a user through a user interface of a computer program running on a computer; recognizing the type of the selected data; and creating a specifier object according to the type, where the specifier object specifies an implementation of an operation. Thus, the implementation of the operation is separated from the user interface.

In another aspect, a computer program stored on a computer-readable medium embodies a user interface for binding operations to data. The user interface includes a plurality of types of data and defines at least one operation, where the operation is type-independent. The user interface also includes at least one implementation of the operation, where each implementation is type-dependent and corresponds to one of the types of data. The user interface includes a selection interface for selecting data. The selection interface, in response to a selection of data, generates a specifier object bound to the selected data, where the specifier object specifies an implementation of the operation corresponding to the type of the selected data Advantages of the invention include one or more of the following. By removing the implementations of operations from the user interface, the user interface is simple and efficient. By separating selection and operations by data type, each data type can be addressed independently, providing for efficient program development.

BRIEF DESCRIPTION OF THE DRAWINGS

FIG. 3 is a flowchart of selecting data.

FIG. 4 is a flowchart of invoking an operation.

DETAILED DESCRIPTION

Figure 1:
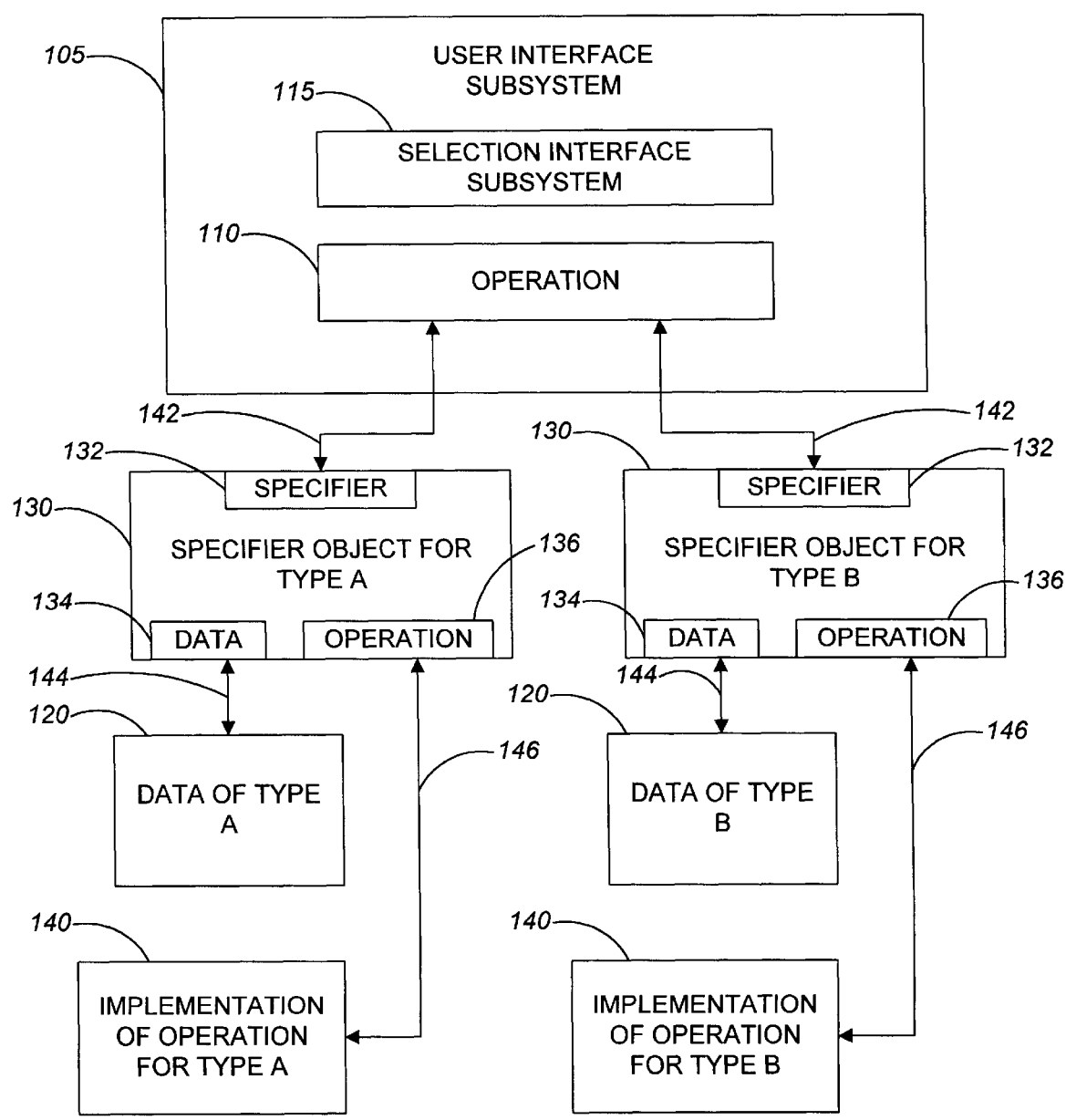
FIG. 1 is a block diagram of interaction between a user interface subsystem and specifier objects according to a preferred implementation.

As shown in FIG. 1, in an application program 100, a user interface subsystem 105 provides a graphical user interface (GUI) that the user sees for receiving selections and commands from a user. The user interface subsystem 105 can be integrated into the application program 100 or can be implemented as an independent code module. The user interface subsystem 105 provides at least one operation 110. Examples of operations 110 include: copy, cut, paste, set font size, change to bold, set color, and numerous others. Some operations 110 are applicable to more than one data type. Editing operations 110 such as copy and paste often apply to any type of data which can be selected in the application program 100. Other operations 110 are particular to one type of data. For example, setting a font size is applied to text, and generally not applicable to a polygon. Each operation 110 available through the user interface subsystem 105 has an implementation for each data type to which the operation 110 can be applied. However, the selection and application of operations 110 in the user interface subsystem 105 is type-independent. Accordingly, the section of the user interface subsystem 105 that addresses operations 110 is implemented generically, that is, without reference to type. As described below, an appropriate type-dependent implementation 140 of the operation 110 is selected through a specifier object 130.

The user interface subsystem 105 includes a selection interface subsystem 115 which allows a user to select data 120. For example, in a word processing application, a user can select a text range using a pointing device, such as a mouse, or through a keyboard. When the user selects data 120, the selection interface subsystem 115 creates a specifier object 130 corresponding to the type of the selected data 120. The specifier object 130 is defined in the code of the application program, or in an associated code module or "plug-in". The definition for the specifier object 130 is dependent upon the type of the data 120 to which the specifier object corresponds.

The selection interface subsystem 115 creates an instance of the specifier object 130 upon selection of data 120 by the user. The selection interface subsystem 115 creates a different type of specifier object 130 for each type of selected data 120. For example, when the user selects a text range, the selection interface subsystem 115 creates a text specifier object 130. When the user selects a polygon, the selection interface subsystem 115 creates a polygon specifier object 130.

The types of specifier objects 130 correspond to the available selection types in the selection interface subsystem 115. In an implementation where the selection interface subsystem 115 allows the user to select ten different types of data 120, the selection interface subsystem 115 can create ten different types of specifier objects 130. A specifier object 130 can correspond to multiple types of data 120 and include "sub-specifier objects" for each type. For example, in one implementation, the selection interface subsystem 115 allows the user to select a text range, a polygon, or a text range and a polygon. In this implementation, the selection interface subsystem 115 can create three specifier objects 130: a text specifier object 130, a polygon specifier object 130, and a combined text-polygon specifier object 130. The text-polygon specifier object 130 includes a text specifier object 130 and a polygon specifier object 130 for applying operations to each part of the selected data 120.

The selection interface subsystem 115 allows the user to make one selection of data 120 at a time for each region or scope in which the user can make a selection, such as a window. As a result, the selection interface subsystem 115 does not create more than one specifier object 130 at a time for each region. When the user deselects the selected data 120, such as by selecting different data 120, the selection interface subsystem 115 destroys the specifier object 130. In an alternative implementation, the selection interface subsystem 115 allows more than one selection at a time in the same region, and can create and maintain multiple specifier objects 130 for that region.

A specifier object 130 includes at least three interfaces: a specifier interface 132, a data interface 134, and one or more operation interfaces 136. An interface is a definition of behavior and responsibilities for an object. The interfaces 132, 134, 136 are abstract definitions of methods implemented for the specifier object 130. The specifier interface 132 defines an access point to the specifier object 130, such as a handle or pointer. The data interface 134 or "selector" interface defines accessing the selected data 120. Each operation interface 136 defines how to access one or more type-dependent implementations 140 of type-independent operations 110. An operation interface 136 can be a suite interface, indicating a suite or group of type-dependent implementations 136 of related operations 110, as described below.

The selection interface subsystem 115 provides the specifier interface 132 to the user interface subsystem 105 after creating the specifier object 130. The user interface subsystem 105 accesses the specifier object 130 through the specifier interface 132 to in turn access the data interface 134 or the operation interfaces 136.

The data interface 134 is used to set and access the selected data 120 corresponding to the specifier object 130. The data 120 can be accessed directly through the data interface 134 or by invoking operations through operation interfaces 136, as described below. The selection interface subsystem 115 uses the data interface 134 to specify the data 120 selected by the user. The user interface subsystem 105 can access the data 120 through operation interfaces 136.

The data interface 134 is defined in a type-dependent manner as part of the definition of the specifier object 130. The data interface 134 defines methods for setting and accessing the data 120 referenced by the specifier object 130. For example, one definition of a specifier object 130 for a range of text includes a data interface 134 defining methods for setting and accessing a position and length of the text range. One definition of a specifier object 130 for a set of graphic objects, such as polygons or bitmaps, includes a data interface 134 where the graphic objects are referenced by identifiers. The data interface 134 defines methods for setting and accessing the identifiers of the graphic objects corresponding to the specifier object 130.

The operation interfaces 136 are used to apply implementations 140 of operations 110 to the data 120. The specifier object 130 includes an operation interface 136 for each operation 110 which the user interface subsystem 105 allows to be applied to the data 120 of the specifier object 130. Each type-dependent implementation 140 of an operation 110 corresponds to an operation interface 136. The implementation 140 is defined separately from the specifier object 130. The operation interface 136 serves as a link between the two. The implementation 140 accesses the data 120 of the specifier object through the data interface 134.

Accordingly, the specifier object 130 and its interfaces 132, 134, and 136 act as a binding point for the user interface subsystem 105, the data 120, and the implementations 140 of operations 110. The bindings are indicated in FIG. 1 by double-headed arrows 142, 144, and 146, respectively. While the user interface subsystem 105, the data 120, and the implementations 140 are separate, the implementations 140 and data 120 are bound together through the specifier object 130. The implementations 140 and data 120 are also bound to the operations 110 of the user interface subsystem 105 through the specifier object 130. This division implements an abstraction of data and implementation so that the application of operations 110 to selected data 120 through the user interface subsystem 105 is defined and operates in a type-independent manner. The data-specific implementations 140 of operations 110 and data management are implemented in the specifier object 130 and accessed through the operation interfaces 136 and data interface 134, respectively.

To apply an operation 110 to the selected data 120, the user interface subsystem 105 uses the specifier interface 132 to query whether the specifier object 130 has a corresponding operation interface 136. Accordingly, the specifier object 130 includes a query interface method, similar to a Query-Interface request in COM, for each operation 110 defined in the user interface subsystem 105. In alternative implementations, queries can be handled by a single query table for the specifier object 130 or by the operation interfaces 136. If the specifier object 130 has an implementation of the operation 110, the user interface subsystem 105 accesses the appropriate operation interface 136. Thus, the application of operations 110 in the user interface subsystem 105 is defined in a type-independent manner. The user interface subsystem treats any selected data 120 generically and leaves the type-dependent processing to the specifier objects 130.

The operation interfaces 136 can be organized in suites for related operations 110. For example, operations 110 for accessing and modifying the color of the selected data 120 can be grouped into a "color suite" operation interface 136. The suite operation interface 136 includes one or more operation interfaces 136 for various operations 110. The color suite interface 136 can include operation interfaces 136 such as "get color" and "set color". The user interface subsystem 105 uses the suite operation interface 136 to check whether the suite as a whole is implemented for the specifier object 130 or not. The user interface subsystem 105 then accesses the individual operation interfaces 136 as appropriate. This suite implementation allows the user interface subsystem 105 to operate in an efficient type-independent manner.

Figure 2A:
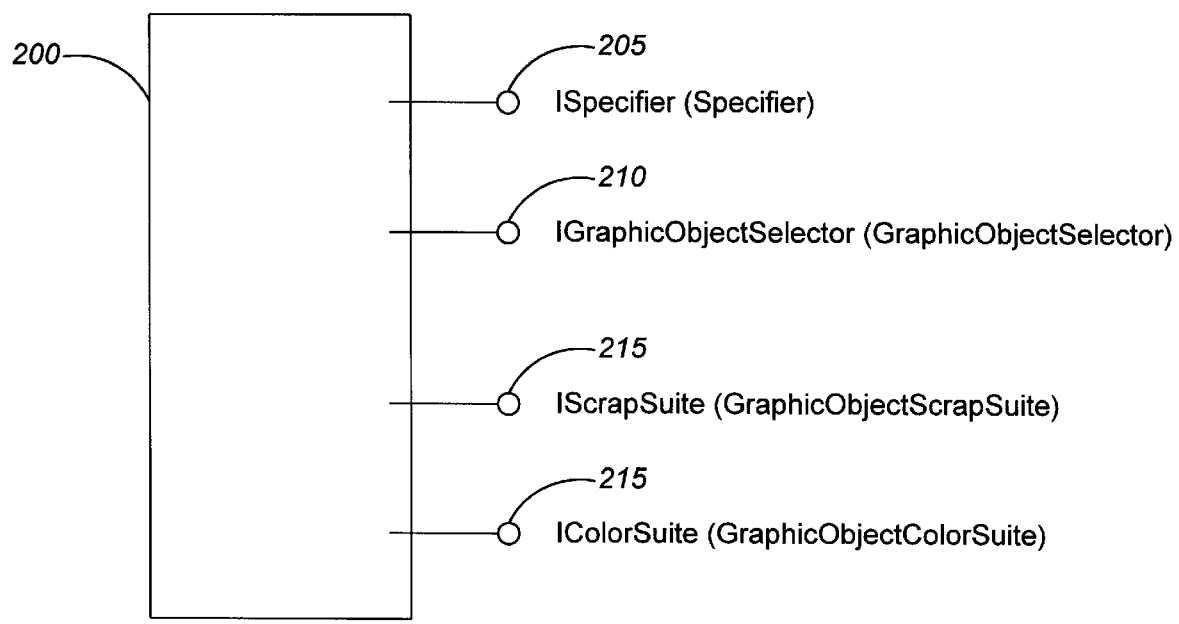
FIGS. 2A and 2B show block diagrams of specifier objects implemented in COM.
Figure 2B:
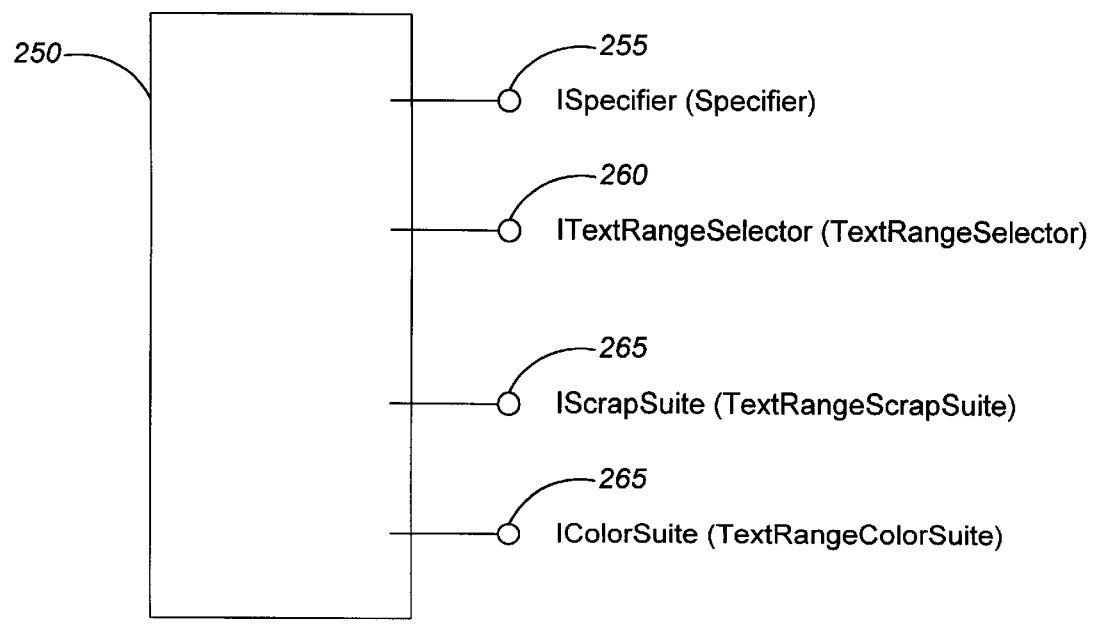

FIGS. 2A and 2B show examples of specifier objects 200, 250 in a COM implementation. In FIG. 2A, a graphic object specifier object 200 includes a specifier interface 205, "ISpecifier (Specifier)", where "ISpecifier" is the name of the interface, and "Specifier" is the implementation class. Specifier object 200 also includes a data interface 210, "IGraphicObjectSelector (GraphicObjectSelector)". Specifier object 200 includes suite operation interfaces 215, "IScrapSuite (GraphicObjectScrapSuite)" and "IColorSuite (GraphicObjectColorSuite)".

In FIG. 2B, a text range specifier object 250 includes a specifier interface 255, "ISpecifier (Specifier)". The name of the specifier interface 255 is the same as the name of the specifier interface 205 for the graphic object specifier object 200. This consistency allows the user interface subsystem 105 to access the specifier objects 200, 250 generically. The user interface subsystem 105 sends requests to the current specifier object 130 as indicated by the specifier interface 132 received from the selection interface subsystem 115. Hence, the user interface subsystem 105 can be unaware of the type of the selected data 120. Specifier object 250 also includes a data interface 260, "ITextRangeSelector (TextRangeSelector)". The data interface 260 is different from that of graphic object specifier object 200 because the user interface subsystem 105 does not access the data interfaces directly. Specifier object 250 includes suite operation interfaces 265, "IScrapSuite (TextRangeScrapSuite)" and "IColorSuite (TextRangeColorSuite)". Again, the suite operation interfaces 260 have consistent names with those of the graphic object specifier object 200 so the user interface subsystem 105 can access the suites in a type-independent manner.

As shown in FIG. 3, in a process 300 of selecting data 120, the user selects data through the selection interface subsystem 115 (step 305). As described above, the selection interface subsystem 115 controls what types or combinations of types of data 120 the user can select. The selection interface subsystem 115 includes a list of the available types of specifier objects 130 and allows the user to select data 120 corresponding to an available specifier object 130. The selection interface subsystem 115 recognizes the type of the selected data 120 (step 310) and creates an instance of a specifier object 130 corresponding to the type of the selected data 120 (step 315). The specifier object 130 includes a specifier interface 132, a data interface 134, and operation interfaces 136, as described above. The operation interfaces 136 bind implementations of the corresponding operations 110 to the specifier object 130 (step 320). Similarly, the data interface 132 binds the selected data 120 to the specifier object 130. The selection interface subsystem 115 passes the specifier interface 132 to the user interface subsystem 105 so the user interface subsystem 105 can access the specifier object 130.

As shown in FIG. 4, in a process 400 of applying an operation 110 to the currently selected data 120, the user interface subsystem 105 receives a selection of an operation 110 from the user (step 405). The user interface subsystem 105 sends a message through the specifier interface 132 to the specifier object 130 corresponding to the selected data 120 to invoke the selected operation 110 (step 410). The specifier object 130 queries through the query interface methods of the specifier object 130 whether the selected operation 110 is implemented for the selected data 120 (step 415). If the selected operation 110 is implemented, the specifier object 130 invokes the implementation of the operation 110 through the corresponding operation interface 136.

In one implementation, the user interface subsystem 105 sends a query for an operation 110 to the specifier object 130 through the specifier interface 132. The specifier object 130 returns a pointer to the implementation 140 of the operation 110 through the operation interface 136 or a value indicating the operation 110 is not implemented, such as a NULL value. The user interface subsystem 105 uses the pointer to invoke the implementation 140 of the operation 110. If the user interface subsystem 105 receives a NULL value, the user interface subsystem 105 recognizes the operation 110 is not implemented and does not attempt to invoke the operation 110. The user interface subsystem 105 can also use the query to determine whether an operation 110 has been implemented without attempting to invoke the operation 110, such as in determining whether to disable or "gray out" menu selections.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

In one implementation, a computer system includes a processor, a random access memory (RAM), a program memory (for example, a writable read-only memory (ROM) such as a flash ROM), a hard drive controller, a video controller, and an input/output (I/O) controller coupled by a processor (CPU) bus. The system can be preprogrammed, in ROM, for example, or it can be programmed (and reprogrammed) by loading a program from another source (for example, from a floppy disk, a CD-ROM, or another computer). The hard drive controller is coupled to a hard disk suitable for storing executable computer programs, including programs embodying the present invention, and data including. The video controller is coupled to a video recorder, which can be used for storing and importing video footage and for writing final output. The I/O controller is coupled by means of an I/O bus to an I/O interface. The I/O interface receives and transmits data (e.g., stills, pictures, movies, and animations for importing into a composition) in analog or digital form over communication links such as a serial link, local area network, wireless link, and parallel link. Also coupled to the I/O bus is a display and a keyboard. Alternatively, separate connections (separate buses) can be used for the I/O interface, display and keyboard.

The invention has been described in terms of particular embodiments. Other embodiments are within the scope of the following claims. For example, the steps of the invention can be performed in a different order and still achieve desirable results. The technique can be applied to a variety of programming environments, such as C++ or LISP. The user interface subsystem can be implemented to use the technique of the invention for only a subset of available operations, providing implementations for certain operations internal to the user interface subsystem. The specifier objects can be defined to implement the methods for accessing data and implementing the operations of the user interface subsystem directly, without the use of abstract interface definitions.

What is claimed is:

1. A method of binding an implementation of an operation to data, comprising:
   receiving a selection of data from a user through a user interface of a computer program running on a computer;
   recognizing a single type of the selected data; and
   creating a type-specific specifier object according to the recognized single type, where the specifier object specifies implementations of one or more operations, each of the specified imiplementations being operable only on data of the recognized single type.

2. The method of claim 1, where the operation can be selected by the user through the user interface.

3. The method of claim 1, where the specifier object includes a reference to the selected data, whereby the selected data can be accessed through the specifier object.

4. The method of claim 1, further comprising accessing the implementation by sending a type-independent request for the operation from the user interface to the specifier object.

5. The method of claim 1, where the user interface accesses the selected data and applies operations to the selected data by sending type-independent requests to the specifier object.

6. The method of claim 1, where the specifier object specifies a suite of implementations, where the suite of implementations corresponds to a suite of operations.

7. The method of claim 6, where the suite of implementations includes implementations of operations related to color.

8. The method of claim 7, where the operations related to color include operations for setting a color and getting a color.

9. The method of claim 1, where the specifier object includes:
   a specifier interface for accessing the specifier object;
   a selector interface for accessing the selected data; and
   at least one suite interface for accessing a corresponding suite of implementations, where each suite of implementations corresponds to a suite of operations.

10. The method of claim 1, where the specifier object is a COM (Component Object Model) object.

11. The method of claim 1, where the implementation is one of a number of implementations of the operation, and where each implementation is applicable to a different type of data.

12. The method of claim 1, where the specifier object specifies an implementation for each operation provided by the user interface for the type of the specifier object.

13. The method of claim 1, further comprising:
   providing a corresponding implementation of the operation for each type of data.

14. The method of claim 1, further comprising:
   providing a first implementation of the operation for a first type of data;
   providing a second implementation of the operation for a second type of data;
   if the selected data is the first type, binding the first implementation to the selected data by creating a specifier object specifying the first implementation; and
   if the selected data is the second type, binding the second implementation to the selected data by creating a specifier object specifying the second implementation.

15. The method of claim 1, further comprising:
   receiving a selection of an operation to be applied to the selected data from the user through the user interface; and
   if an implementation of the selected operation is specified by the specifier object, invoking the implementation.

16. The method of claim 15, where the user interface sends a query to a specifier object to determine whether an implementation of the selected operation is specified by the specifier object.

17. The method of claim 1, where the specifier object is defined in a separate software component from the user interface.

18. A method of binding operations to data, comprising:
   receiving a selection of data from a user through a user interface of a computer program running on a computer;
   recognizing a single type of the selected data;
   creating a type-specific specifier object based on the recognized single type of the selected data;
   binding the selected data to the type-specific specifier object; and
   binding a type-dependent implementation of an operation to the type-specific specifier object according to the recognized single type of the selected data, the type-dependent implementation being operable only on data of the recognized single type.

19. The method of claim 18, further comprising:
   receiving a selection of an operation to be applied to the selected data from the user through the user interface; and if an implementation of the selected operation is bound to the specifier object, invoking the implementation.

20. The method of claim 18, further comprising:
invoking the operation through the user interface, where the user interface sends a type-independent request to the specifier object to invoke the operation; and
invoking the type-dependent implementation through the specifier object, where the specifier object invokes the type-dependent implementation in response to the type-independent request from the user interface.

21. A computer program stored on a computer-readable medium, for binding operations to data, including instructions operable to cause a computer to:
receive a selection of data having a type from a user through a user interface;
recognize the type of the selected data; and
create a specifier object according to the type, where the specifier object specifies an implementation of an operation that can be performed on data of the type.

22. The computer program product of claim 21, wherein the operation can be selected by the user through the user interface.

23. The computer program product of claim 21, wherein the specifier object includes a reference to the selected data, whereby the selected data can be accessed through the specifier object.

24. The computer program product of claim 21, further comprising instructions operable to cause a computer to access the implementation by sending a type-independent request for the operation from the user interface to the specifier object.

25. The computer program product of claim 21, wherein the user interface accesses the selected data and applies operations to the selected data by sending type-independent requests to the specifier object.

26. The computer program product of claim 21, wherein the specifier object specifies a suite of implementations, where the suite of implementations corresponds to a suite of operations.

27. The computer program product of claim 26, wherein the suite of implementations includes implementations of operations related to color.

28. The computer program product of claim 27, wherein the operations related to color include operations for setting a color and getting a color.

29. The computer program product of claim 21, wherein the specifier object includes:
a specifier interface for accessing the specifier object;
a selector interface for accessing the selected data; and
at least one suite interface for accessing a corresponding suite of implementations, where each suite of implementations corresponds to a suite of operations.

30. The computer program product of claim 21, wherein the specifier object is a COM (Component Object Model) object.

31. The computer program product of claim 21, wherein the implementation is one of a number of implementations of the operation, and where each implementation is applicable to a different type of data.

32. The computer program product of claim 21, wherein the specifier object specifies an implementation for each operation provided by the user interface for the type of the specifier object.

33. The computer program product of claim 21, further comprising instructions operable to cause a computer to:
provide a corresponding implementation of the operation for each type of data.

34. The computer program product of claim 21, further comprising instructions operable to cause a computer to:
provide a first implementation of the operation for a first type of data;
provide a second implementation of the operation for a second type of data;
if the selected data is the first type, bind the first implementation to the selected data by creating a specifier object specifying the first implementation; and
if the selected data is the second type, bind the second implementation to the selected data by creating a specifier object specifying the second implementation.

35. The computer program product of claim 21, further comprising instructions operable to cause a computer to:
receive a selection of an operation to be applied to the selected data from the user through the user interface; and
if an implementation of the selected operation is specified by the specifier object, invoke the implementation.

36. The computer program product of claim 35, where the user interface sends a query to a specifier object to determine whether an implementation of the selected operation is specified by the specifier object.

37. The computer program product of claim 21, where the specifier object is defined in a separate software component from the user interface.

38. A computer program plug-in stored on a computer-readable medium, for binding operations to data, including instructions operable to cause a computer to:
create a specifier object corresponding to a type of data, where the specifier object defines:
a selector interface for accessing a selection of data of the type, selected through a user interface, and
an operation interface for accessing an implementation of an operation to be applied to the selected data of the type,
where the specifier object is created in response to a user selecting the selection of data through the user interface.

39. The computer program of claim 38, where the specifier object defines a suite interface specifying a suite of implementations for a suite of operations to be applied to the selected data of the type.

40. The computer program of claim 38, where the selector interface specifies one or more methods according to the type of the selected data.

41. The computer program of claim 38, where the operation interface specifies one or more methods according to the type of the selected data.

42. The computer program of claim 38, where the computer program is loaded as a plug-in by another computer program.

43. A computer program stored on a computer-readable medium, including instructions operable to cause a computer to:
provide a plurality of types of data;
provide an operation in a user interface, where the operation is type-independent;
provide at least one implementation of the operation, where each implementation is type-dependent and corresponds to a type of data;
provide a selection interface for selecting data through the user interface; and
provide an object generator which, in response to a selection of data through the selection interface, generates a specifier object bound to the selected data, where the specifier object specifies an implementation of the operation according to the type of the selected data.

44. The computer program of claim 43, further comprising a query interface method for querying a specifier object whether the specifier object specifies an implementation of a particular operation.

45. The computer program of claim 43, where the user interface sends a type-independent message to the specifier object to invoke the operation, and in response the specifier object invokes the implementation of the operation specified by the specifier object.

46. A computer program stored on a computer-readable medium, for binding operations to data, including instructions operable to cause a computer to:

receive a selection of data from a user through a user interface of a computer program running on a computer;

recognize a single type of the selected data;

create a type-specific specifier object based on the recognized single type of the selected data;

bind the selected data to the type-specific specifier object; and bind a type-dependent implementation of an operation to the type-specific specifier object according to the recognized single type of the selected data, the type-dependent implementation being operable only on data of the recognized single type.

47. The computer program product of claims 46, further comprising instructions operable to cause a computer to:

receive a selection of an operation to be applied to the selected data from the user through the user interface; and if an implementation of the selected operation is bound to the specifier object, invoke the implementation.

48. The computer program product of claim 46, further comprising instructions operable to cause a computer to:

invoke the operation through the user interface, where the user interface sends a type-independent request to the specifier object to invoke the operation; and invoke the type-dependent implementation through the specifier object, where the specifier object invokes the type-dependent implementation in response to the type-independent request from the user interface.

* * * * *

UNITED STATES PATENT AND TRADEMARK OFFICE
CERTIFICATE OF CORRECTION

PATENT NO.      : 6,621,506 B2
DATED           : September 16, 2003
INVENTOR(S)     : A. Michael Burbidge It is certified that error appears in the above-identified patent and that said Letters Patent is hereby corrected as shown below:

Title page,
Item [56], References Cited, OTHER PUBLICATIONS, delete final reference "Don Box, 'Essential COM…'"

Column 7,
Line 47, replace "each of the specified imiplementations" with -- each of the specified implementations --

Column 9,
Lines 17-19, replace "create a specifier object according to the type, where the specifier object specifies an implementation of an operation that can be performed of data of the type." with -- create a type-specific specifier object according to the recognized single type, where the type-specific specifier object specifies implementations of one or more operations, each of the specified implementations being operable only on data of the recognized single type. --

Column 10,
Line 31, replace "create a specifier object" with -- create a type-specific specifier object --

Column 11,
Lines 1-2, replace "a specifier object bound to the selected data, where the specifier object" with -- a type-specific specifier object bound to the selected data, where the type-specific specifier object --

Column 12,
Line 6, replace "claims 46" with -- claim 46 --

Signed and Sealed this

Twenty-ninth Day of June, 2004

JON W. DUDAS
*Acting Director of the United States Patent and Trademark Office*